SURGE-DAMPENING SYSTEM

BACKGROUND OF THE INVENTION

1. Field of the Invention

The invention relates to the field of dampening systems suitable for use in towing and mooring vessels.

2. Description of the Prior Art

In towing a vessel, particularly in ocean waters, extremely high tensions are generated in the towing gear or line. These tensions are caused by the wave action on the towed and towing vessels, and the resulting relative movement of the vessels. The magnitude of this tension often greatly exceeds the strength of the points on the vessels to which the line is attached. Long lines are generally used to permit the relative movement and attenuate the tension created by the wave motion. The stretching and movement of the line absorbs energy, thereby attenuating the forces that would otherwise be exerted on the vessels.

It is common to utilize very long sagging tow lines in order to absorb and dissipate sufficient energy to attenuate the forces caused by wave action to a tolerable level. Typically, lines of 2,500 to 5,000 feet are utilized. These lines, while supplying the required attenuation, have the disadvantage of having considerable drag since they must be towed through the water by the towing vessel. Often, as much as 35 percent of the towing vessel's power is utilized to tow the line connecting the two vessels.

A similar problem exists with mooring a vessel. Wave action on the moored vessel, particularly when the vessel is moored in rough waters, creates high tensions in the mooring cables. It is a common practice to utilize long mooring lines in order to attenuate these forces.

One prior art attempt to solve part of the problem is to employ springs interposed in the tow line. Such a solution has in general, been impractical and unacceptable. The springs employed are large and heavy. For example, to obtain the desired compensation, a spring of 40 feet in length may be required. In addition, it may create a snapback situation which could result in even greater forces. Finally, the desired spring rate and load buildup is extremely difficult to achieve with a practical and economical spring.

SUMMARY OF THE INVENTION

A surge dampener is utilized in the line or gear which is utilized to tow or moor a ship. The dampener is pivotally coupled to a secure point on a vessel when used as part of a towing system. The dampener comprises a hydraulic cylinder having a piston and a piston rod. The piston rod is coupled to the line which is used to moor or tow a vessel. An accumulator cylinder, which is coupled to the hydraulic cylinder, contains a free piston which separates hydraulic fluid from a gas or pneumatic section of the cylinder. The accumulator is adapted to receive hydraulic fluid from the hydraulic cylinder when the piston rod moves. As fluid is forced into the accumulator, the gas in the pneumatic section of the accumulator cylinder is compressed. Work is performed on both the hydraulic cylinder and gas, which absorbs energy from the movement of the piston rod. This energy absorption and loss attenuates the forces applied to the line or gear, particularly those generated by wave action.

It is an object of this invention to provide a surge-dampening system suitable for use in towing or mooring a vessel.

It is still a further object of this invention to provide a surge dampener which attenuates the forces exerted on a towing or mooring, line or gear generated by wave motion.

BRIEF DESCRIPTION OF THE DRAWINGS

FIG. 2 illustrates a side view of a surge dampener with partial cutaway views of the hydraulic cylinder and accumulator cylinder;

FIG. 3 illustrates a vessel moored to a dock where the mooring lines contain two surge dampeners;

FIG. 4 illustrates a surge dampener secured to a vessel and coupled to a steering bridle and a safety bridle;

FIG. 5 illustrates an expanded view of the end of the hydraulic cylinder nearest the piston rod, containing two shock absorbers;

FIG. 6 is a side view of a surge dampener pivotally mounted to a secured point on a vessel;

FIG. 7 is a top view of the trunnion to which the surge dampener of FIG. 6 is mounted; and FIG. 8 is an expanded side view of the trunnion to which the surge dampener of FIGS. 6 and 7 is mounted.

DETAILED DESCRIPTION OF THE INVENTION

Figure 1:
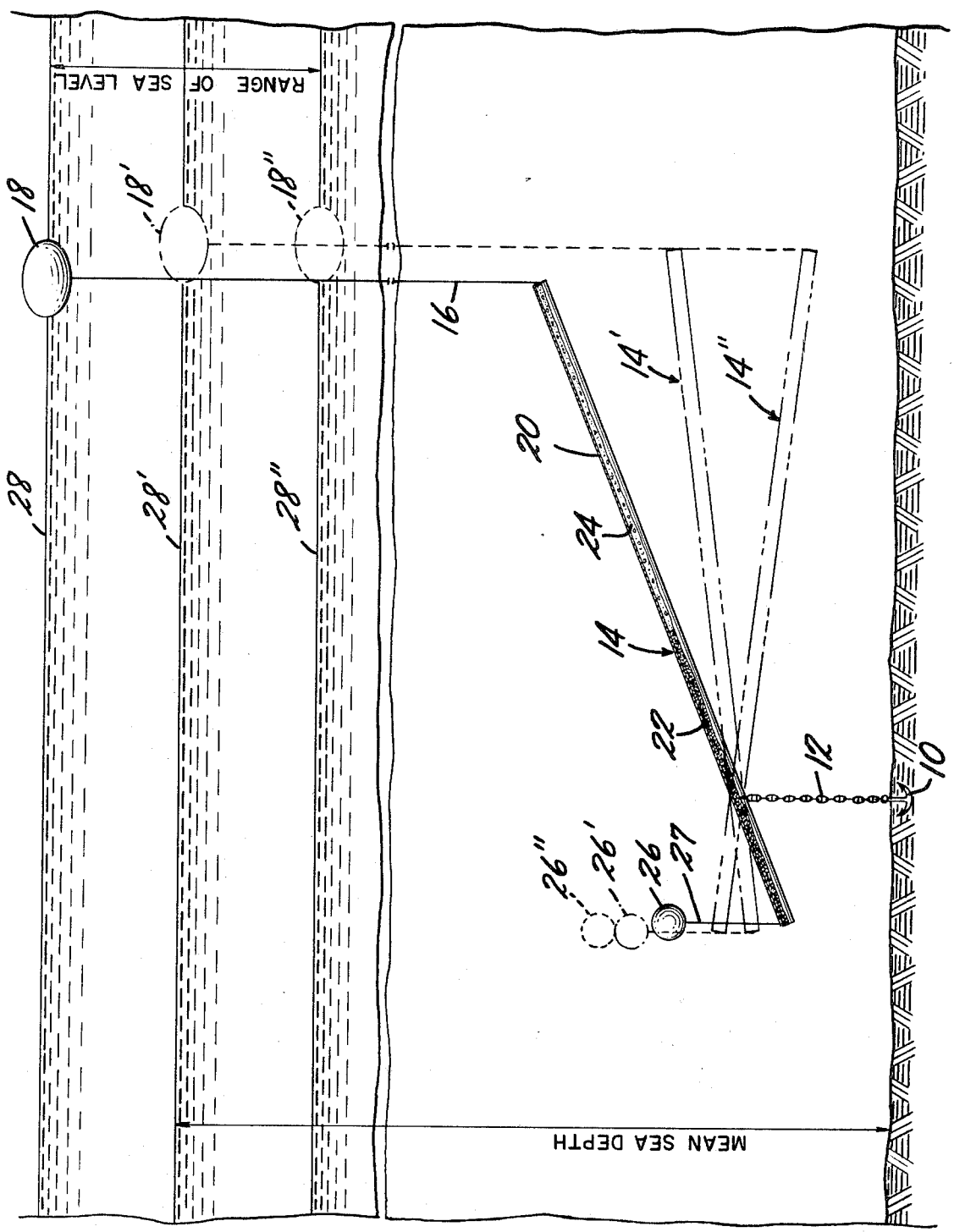
FIG. 1 illustrates two vessels being towed, one with a conventional line and the other with a shortened line.

Referring to FIG. 2, a surge dampener 10 is illustrated. Dampener 10 is comprised of hydraulic cylinder 14, accumulator cylinder 12, coupling means between the accumulator and the hydraulic cylinders, pistons 16 and 34 and a piston rod 17. The dampener 10 is illustrated in FIG. 1 pivotally coupled to a mount 32.

Hydraulic cylinder 14 is an elongated cylinder suitable for containing a hydraulic fluid. Piston 16 is disposed within cylinder 14 and sealingly engages the inner surface of cylinder 14. Piston rod 17, coupled to piston 16 by screw thread means, is disposed through end 15 of hydraulic cylinder 14. End 15, which sealingly engages rod 17, is coupled to cylinder 14 by threaded means. Hydraulic cylinder 14 must be adaptable to sealingly contain a fluid between piston 16 and end 15. An eye bolt 19 is coupled to piston rod 17 at the end of the rod opposite piston 16. Hydraulic cylinder 14 along with its piston 16 and piston rod 17 may be constructed in accordance with commonly known methods and techniques.

Accumulator cylinder 12 is coupled in juxtaposition to hydraulic cylinder 14. Space blocks 37 are used to support accumulator 12 on cylinder 14. Straps 29 are disposed about the periphery of accumulator 12 and cylinder 14 and are used to fasten accumulator 12 to cylinder 14. Accumulator cylinder 12 has a cylindrical shape and is adaptable for containing a liquid and a gas. Free piston 34, which is freely movable within the cylinder, slidingly engages the inner surface of accumulator cylinder 12. Filler port 36 is coupled to one end of the accumulator 12. The filler port is any port suitable for allowing a gas to flow into the accumulator. The accumulator cylinder 12 must be suitable for containing a fluid between free piston 34 and end 23, and suitable for containing a compressed gas between free piston 34 and end 18. Accumulator 12 may be constructed in accordance with the same technique and methods required to construct hydraulic cylinder 14.

Hydraulic cylinder 14 is coupled to accumulator 12 by means of flow regulator 27 and T-connector 24. One end of flow regulator 27 is coupled to hydraulic cylinder 14 at or near the end of the hydraulic cylinder closest to end 15. The other end of flow regulator 27 is coupled to T-connector 24. T-connector 24 is in turn coupled to accumulator 12 at end 23 and filler port 25. Hydraulic filler port 25 may be a commonly utilized filler port for inserting hydraulic fluid into the accumulator 12 and hydraulic cylinder 14. The T-connector 24, filler port 25 and flow regulator 27 may be commonly utilized hydraulic components made to engage one another, accumulator 12, and hydraulic cylinder 14 by threaded means. Flow regulator 27 may be a commonly utilized flow regulation device for permitting fluid to freely flow into cylinder 12 by movement of piston 16 from left to right in FIG. 1 and for restricting the flow of fluid from cylinder 12 back to cylinder 14 when piston 16 moves in the opposite direction. This enables piston rod 17 to move from right to left in FIG. 2 in a controlled manner.

The operation of the surge dampener 10 may be readily understood from FIG. 2. Hydraulic fluid fills the volume in the dampener 10 between free piston 34 and piston 16. This entire

INVENTOR.
ANDREW W. D'ANGELO

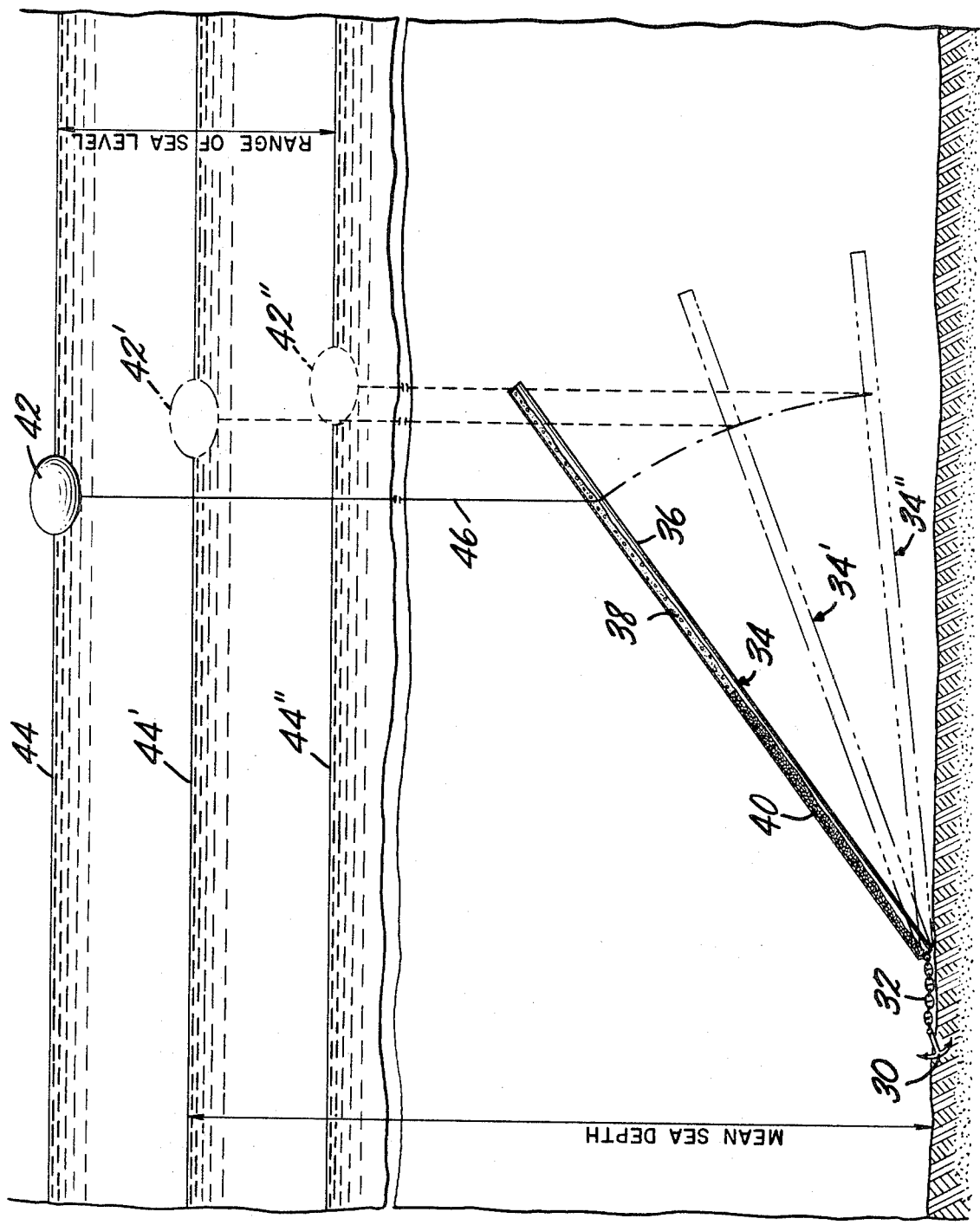

3,576,171

MOORING APPARATUS

BACKGROUND OF THE INVENTION

The present invention relates to mooring apparatus and more particularly, to a novel and highly effective mooring apparatus which cannot become tangled due to fluctuations in the depth of the water.

In conventional mooring apparatus a buoy is attached to an anchor by a long flexible cable, chain or rope known as a catenary. It is also known to use several cables, chains or ropes, the least flexible being closest to the anchor. A difficult problem presented by this conventional apparatus is that when the depth of the water is low and the buoy floats close to the anchor there is a considerable amount of slack in the catenary and other flexible members which can become tangled. If this happens the buoy may be dragged under water or the catenary may be broken when the depth of the water rises again.

SUMMARY OF THE INVENTION

The present invention utilizes an elongated rigid member which tends to be buoyant at one end and which tends to sink at the other end. The more buoyant end is attached to an anchor and the less buoyant end is attached to an anchor and the less buoyant end is attached, by a catenary, to a buoy. When the depth of the water changes because of tides or waves the end of the rigid member which is attached to the buoy moves up and down while the member pivots about the point at which the more buoyant end is attached to the anchor. When this apparatus is used no slack develops in the flexible members and they are thereby prevented from becoming tangled when the depth of the water fluctuates.

BRIEF DESCRIPTION OF THE DRAWINGS

An understanding of additional aspects of the invention can be gained from a consideration of the following detailed description of two representative embodiments of the invention, in conjunction with the appended drawings, wherein:

FIG. 1 shows an embodiment of the invention suitable for use when the surface at the bottom of the water is hard; and FIG. 2 shows a second embodiment of the invention more suitable for use when the surface at the bottom of the water is soft.

DESCRIPTION OF THE PREFERRED EMBODIMENTS

FIG. 1 shows an embodiment of the invention most suitable when the surface at the bottom of the water is hard and an anchor can be securely attached to the bottom so as to enable it to withstand a relatively large vertical force pulling toward the surface.

The apparatus shown in FIG. 1 includes an anchor 10, a first connecting member 12 connecting the anchor to a rigid member generally indicated by the numeral 14, and a second connecting member 16 connecting the rigid member to a buoy 18. The rigid member 14 is comprised of a pipe 20 having two sections. The first section 22, which is nearest to the anchor, is filled with air, foam, or some other buoyant material. The second section 24 is filled with concrete or some other heavy material. A highly buoyant member 26 is attached, by cable 27, to the end of the rigid member 14 which is closest to the anchor. This adds to the buoyancy and stability of this end of the rigid member 14.

The device is illustrated in the various positions which it assumes as the level of the water changes. In the first position the elements of the apparatus 14, 16, 18, 26, and 27 are shown in solid lines and the water level is indicated by the line 28. As the water level decreases to the levels 28' and 28" the corresponding positions of the various elements of the apparatus are designated with the appropriate number of the prime symbols.

The above-described apparatus operates in the following manner. The buoyant end of the member 14 tends to assume a position at the least possible depth. It therefore holds the first connecting member 12 in a vertical position. The less buoyant end of the member 14 tends to sink and therefore exerts a downward force on the second connecting member 16 tending to hold the buoy 18 directly above the point at which the connecting member 16 is attached to the rigid member 14. When the water level drops, for instance from 28 to 28", the more dense end of the member 14 is allowed to sink. The member 14 pivots about the point at which it is connected to the first connecting member 12 and assumes the positions indicated by broken lines designated 14".

It can be seen from the above description of the operation of the apparatus that it eliminates the presence of the apparatus that it eliminates the presence of loose sections of flexible ropes, chains or cables which can become entangled when the water level decreases. The change in the vertical distance between the buoy 18 and the anchor 10 is compensated for by the pivoting of the rigid member 14.

The anchor 10, as shown here, must be embedded in the surface at the bottom of the body of water in such a way that it can reliably withstand the vertical force exerted on it by the connecting member 12. For this reason the embodiment of the invention shown in FIG. 1 is most suitable in those situations in which the anchor can be embedded in a hard substance.

It is noted here that the first connecting member 12, which is shown here as a chain, could be any type of chain, rope or cable having suitable strength and flexibility. This is also true of the second connecting member 16, commonly referred to as a catenary, which is connected to the buoy 18. The rigid member 14 must be made buoyant and tend to rise at the end nearest the anchor and must tend to sink at the end nearest the buoy 18. As mentioned above, this can be accomplished by filling the section 20 with foam or some other buoyant material and by filling section 24 with concrete or some other heavy material. To increase the buoyancy and stability of the end of the rigid member 14 nearest the anchor 10 one or more buoyant members, shown here and designated 26, can be attached to that end. Similarly, weights could be attached to the end 24 to increase its tendency to sink. It would be possible to utilize a rigid member 14 of uniform density relying solely upon floats and weights at the appropriate ends as the means for providing the desired buoyancy characteristics. When the buoyancy of a section of the rigid member is referred to here it is considered to include the effects of any floats or weights attached to the rigid member itself.

FIG. 2 of the drawings shows a second embodiment of the invention, which although similar to the apparatus of FIG. 1, is appropriate for use where the surface at the bottom of the water is soft. Here an anchor 30 is attached by a chain 32 to the relatively buoyant end of a rigid member 34. The member 34 consists of a pipe 36 having two sections 38 and 40, section 38 being more dense and less buoyant that section 40. The member 34 is connected at its less buoyant end to buoy 42 by the catenary 46.

The term buoyancy is used here in reference to a characteristic of elements of the apparatus intended to be placed under water. A reference to the buoyancy of a member or part of a member is not intended to imply that the member is buoyant in the sense that it would float.

The principal difference between this embodiment and the embodiment shown in FIG. 1 is that here the more buoyant end of the rigid member 34 is in fact heavier than water and accordingly lies on the bottom allowing the chain 32 to assume a horizontal position. Thus the force on the anchor 30 has a large horizontal component and a minimal vertical component thereby minimizing the tendency of the apparatus to pull the anchor 30 up out of the soft bottom.

It is noted that here the highly buoyant member 26, shown in FIG. 1, is not included. This at least partially accounts for the decreased buoyancy of the more buoyant end of the rigid member 34 as compared to the rigid member 14 in FIG. 1.

Although both ends of the member 34 are heavier than water it is important in this second embodiment as well as in the first that the rigid member be comprised of two sections of differing density designated 38 and 40. This causes the center of gravity of the member 40 to be closer to the cable 46 than it would be if the rigid member 34 were of uniform density. Accordingly, the vertical force acting on the rigid member at its less buoyant end is reduced in comparison to the force which the rigid member exerts on the cable 46.

It is important that the vertical force acting on the less buoyant end of the rigid member be reduced because this proportionately reduces the frictional forces tending to wear the chain 32. The frictional forces are minimized when the section 40 of rigid member 34 most closely approximates the density of water.

This second embodiment of the invention operates in substantially the same way as the first. As the water level drops from 44 through 44' to 44'' the buoy 42 moves to the positions shown in broken lines at which it is appropriately designated 42' and 42''. Similarly, the rigid member 34 moves through positions 34' to position 34''.

The above-described embodiments are intended to be illustrative of the inventive concept. It will occur to those skilled in the art that the invention is subject to numerous variations and modifications.

I claim:

1. A mooring apparatus comprising an elongated rigid member, means for causing a section at one end of said rigid member to be more buoyant, means for causing another section of said rigid member at the opposite end to be less buoyant, an anchor means for attaching said mooring apparatus to the bottom of a body of water, a buoy suitable for floating on the surface of the body of water, a first connecting member connecting said anchor means to the more buoyant section of said rigid member, and a second connecting member connecting said buoy to the less buoyant section of said rigid member.

2. A mooring apparatus comprising an elongated rigid member having a more buoyant section containing a lightweight material and a less buoyant section containing a heavy material, an anchor means for attaching said mooring apparatus to the bottom of a body of water, a buoy suitable for floating on the surface of the body of water, a first connecting member connecting said anchor means to the more buoyant section of said rigid member, and a second connecting member connecting said buoy to the less buoyant section of said rigid member.

3. The apparatus of claim 2 in which the more buoyant section of said rigid member is heavier than water.

4. The apparatus of claim 2 in which the more buoyant section of said rigid member is lighter than water.

5. The apparatus of claim 2 further comprising a separate buoyant member which is lighter than water attached to the more buoyant section of said rigid member.

6. A mooring apparatus comprising an elongated rigid member the buoyancy characteristics of which are such that it tends to sink at one end and it tends to rise at the other end, an anchor pivotably connected to the more buoyant end and a buoy pivotably connected to the less buoyant end, whereby said rigid member is angularly displaceable to compensate for variations in the depth of the water.